(12) United States Patent
Zito

(10) Patent No.: US 9,672,504 B2
(45) Date of Patent: Jun. 6, 2017

(54) PROCESSING PAYMENT AT A POINT OF SALE WITH LIMITED INFORMATION

(75) Inventor: Sean Zito, Glen Arm, MD (US)

(73) Assignee: PAYPAL, INC., San Jose, CA (US)

( * ) Notice: Subject to any disclaimer, the term of this patent is extended or adjusted under 35 U.S.C. 154(b) by 228 days.

(21) Appl. No.: 13/398,697

(22) Filed: Feb. 16, 2012

(65) Prior Publication Data

US 2013/0218693 A1    Aug. 22, 2013

(51) Int. Cl.
 *G06Q 30/00* (2012.01)
 *G06Q 20/20* (2012.01)
 *G06Q 40/02* (2012.01)
 *G06Q 20/24* (2012.01)

(52) U.S. Cl.
 CPC ............ *G06Q 20/20* (2013.01); *G06Q 20/24* (2013.01); *G06Q 40/02* (2013.01)

(58) Field of Classification Search
 CPC ............................... G06Q 30/00; G06Q 20/00
 USPC ......... 235/375, 376, 380, 383; 705/16, 26.1, 705/38, 40; 709/217, 223
 See application file for complete search history.

(56) References Cited

U.S. PATENT DOCUMENTS

| | | | | |
|---|---|---|---|---|
| 5,202,826 | A * | 4/1993 | McCarthy | 705/14.17 |
| 5,628,051 | A * | 5/1997 | Salin | 455/433 |
| 6,354,491 | B2 * | 3/2002 | Nichols et al. | 235/379 |
| 7,131,571 | B2 * | 11/2006 | Swift et al. | 235/375 |
| 7,427,019 | B2 * | 9/2008 | Haertel | 235/380 |
| 7,437,328 | B2 * | 10/2008 | Graves et al. | 705/40 |
| 7,461,775 | B2 * | 12/2008 | Swift et al. | 235/379 |
| 7,505,938 | B2 * | 3/2009 | Lang et al. | 705/38 |
| 7,539,736 | B2 * | 5/2009 | Shuster | 709/217 |
| 7,635,083 | B2 * | 12/2009 | Fukuda et al. | 235/379 |
| 7,636,690 | B2 * | 12/2009 | Swift et al. | 705/45 |
| 7,780,522 | B2 * | 8/2010 | Lutnick et al. | 463/25 |
| 7,854,886 | B2 * | 12/2010 | Tamaki et al. | 419/8 |
| 7,856,377 | B2 * | 12/2010 | Cohagan et al. | 705/14.3 |
| 7,861,930 | B2 * | 1/2011 | Esplin et al. | 235/383 |
| 7,870,998 | B2 * | 1/2011 | Chase-Salerno et al. | 235/380 |
| 7,918,392 | B2 * | 4/2011 | Beck et al. | 235/380 |
| 8,074,876 | B2 * | 12/2011 | Foss et al. | 235/380 |
| 8,078,481 | B2 * | 12/2011 | Steinbarth et al. | 705/4 |
| 8,180,671 | B2 * | 5/2012 | Cohagan et al. | 705/14.3 |
| 8,275,798 | B2 * | 9/2012 | Macwan et al. | 707/796 |
| 8,359,270 | B2 * | 1/2013 | Pence et al. | 705/44 |
| 8,370,264 | B1 * | 2/2013 | Wei et al. | 705/65 |
| 8,370,265 | B2 * | 2/2013 | Coulter et al. | 705/67 |
| 8,396,747 | B2 * | 3/2013 | Bachenheimer | 705/18 |
| 8,533,059 | B2 * | 9/2013 | Nihalani et al. | 705/26.1 |
| 8,538,801 | B2 * | 9/2013 | Giordano et al. | 705/13 |
| 8,615,437 | B2 * | 12/2013 | Yoo | 705/16 |

(Continued)

*Primary Examiner* — Andrew Joseph Rudy
(74) *Attorney, Agent, or Firm* — Haynes & Boone, LLP

(57) ABSTRACT

A consumer at a POS is able to obtain instant credit from a third party payment provider by providing identification information, such as from a driver's license, through a sales associate at the POS and by providing directly the last four digits of the consumer's social security number (SSN). When the consumer wants to make subsequent purchases through the payment provider, the sales associate need only enter the consumer's last name, zip code, and date of birth for the payment provider to locate and retrieve the consumer's account. The consumer may then enter the last four digits of the consumer's social security number, such as into a PIN pad at the POS, and have the information processed by the payment provider.

16 Claims, 4 Drawing Sheets

(56) References Cited

U.S. PATENT DOCUMENTS

| | | |
|---|---|---|
| 8,616,448 B2* | 12/2013 | Esplin et al. ................ 235/383 |
| 8,645,275 B2* | 2/2014 | Seifert et al. .................. 705/44 |
| 8,732,479 B1* | 5/2014 | Henriksen et al. ........... 713/189 |
| 8,755,510 B2* | 6/2014 | Erbey et al. ............ 379/265.02 |
| 8,818,907 B2* | 8/2014 | Bonalle et al. ................ 705/65 |
| 2003/0208439 A1* | 11/2003 | Rast ................................ 705/38 |
| 2008/0203153 A1 | 8/2008 | Keithley et al. |
| 2009/0055323 A1 | 2/2009 | Rebidue et al. |
| 2009/0276322 A1 | 11/2009 | Sunde et al. |
| 2009/0319352 A1* | 12/2009 | Boyle et al. ............... 705/14.15 |
| 2010/0049651 A1* | 2/2010 | Lang et al. .................... 705/38 |
| 2011/0022454 A1 | 1/2011 | Lefebvre et al. |
| 2012/0029996 A1 | 2/2012 | Lang et al. |

\* cited by examiner

PROCESSING PAYMENT AT A POINT OF SALE WITH LIMITED INFORMATION

BACKGROUND

Technical Field

The present invention generally relates to transactions at a point of sale (POS), and in particular, obtaining and/or paying with credit at a POS.

Related Art

Shopping online or electronically is becoming more and more prevalent. This is due in part to the ease of which a consumer can find, pay, and complete a transaction without going to a seller's physical location. Such online shopping is predominantly done from a consumer's PC or laptop, but also from the consumer's mobile device, and as such, payment providers have developed payment products that enable the consumer to quickly, easily, and safely make an electronic payment for a purchase. Online payment services, such as PayPal, Inc. of San Jose, Calif. offer services to allow consumers to make payments through the payment provider. If a consumer does not have an account with a payment provider, the consumer may easily apply and get credit during the checkout flow on the merchant site. One such payment provider is Bill Me Later.

However, even with increased online shopping, consumers still shop at physical stores and locations for numerous reasons, including being able to see and try on items, interact with sales associates for help, and to just be around people. Such consumers may also desire to make purchases with credit, but may not have an existing or acceptable credit card account to do so.

In such a situation, the consumer may decide to not make a purchase, resulting in a lost sale for the merchant and a lost item for the consumer.

If the consumer does decide to open a line of credit at the POS, the consumer typically opens a store-specific account. This may require the consumer to provide very specific and detailed information and may take time and effort to complete.

It would be advantageous to have a method in which a consumer can obtain instant credit with an online payment provider at a POS with limited information.

SUMMARY

According to one embodiment, a consumer at a POS is able to obtain instant credit from a third party payment provider by providing identification information, such as from a driver's license, through a sales associate at the POS and by providing directly the last four digits of the consumer's social security number (SSN). The sales associate may also enter details of a transaction, such as a payment amount, so that the consumer can obtain credit and make the payment in the same transaction. When the consumer wants to make subsequent purchases through the payment provider, the sales associate need only enter specific identifying information about the consumer, again such as available from the consumer's driver license for the payment provider to locate and retrieve the consumer's account. The consumer may then enter the last four digits of the consumer's social security number, such as into a PIN pad at the POS, and have the information processed by the payment provider. As such, the consumer is able to make a payment at a POS by simply providing the sales associate with an ID and then entering the consumer's last four digits of the SSN.

In one embodiment, when applying for credit, the sales associate enters the consumers first and last name, mailing/resident address, date of birth, and phone number. The latter may be requested from or entered by the consumer if not available on the ID. Optionally, the sales associate or consumer may also enter the consumer's email address.

If, at the POS, the consumer does not wish to make a purchase, but simply wants to open an account with the payment provider, the sales associate need only enter a zero dollar amount for the transaction. The sales associate may also proceed with this process in other ways, such as by selecting an appropriate option on a merchant device or terminal.

If approved, either with or without payment at the POS, the consumer may be notified, such as through a merchant PIN pad or a user device, an approved credit limit along with the approval/payment notification. The sales associate may be notified of a payment approval as well, so that the sales associate can then complete the transaction with the consumer.

After the consumer has opened an account with the payment provider, the consumer may make a purchase at a POS by entering or having the sales associate enter consumer date of birth (month, day, year), last name, and zip code of mailing or residence address. Details of the purchase, such as merchant information and amount, may also be transmitted at this time. The payment provider uses this information to look up a consumer account. The results are presented to the sales associate, who selects or confirms the proper account using the consumer's identification.

The payment provider may then display consumer information, such as name, address, and phone number, along with transaction details, to the sales associate at the POS. At the same time, the payment provider may also display, through a merchant device such as a PIN pad, a request for the consumer to enter the last four digits of the consumer's SSN. The payment provider then processes the payment request based on the information and notifies the consumer and/or the sales associate of an approved or denied payment.

As a result, a consumer is able to quickly and easily make a purchase at a POS with instant credit provided with limited information. After the account is opened, the consumer can again utilize credit at a POS with limited information provided, e.g., name, address, phone number, and last four digits of the SSN.

These and other aspects of the present disclosure will be more readily apparent from the detailed description of the embodiments set forth below taken in conjunction with the accompanying drawings.

Figure 1:
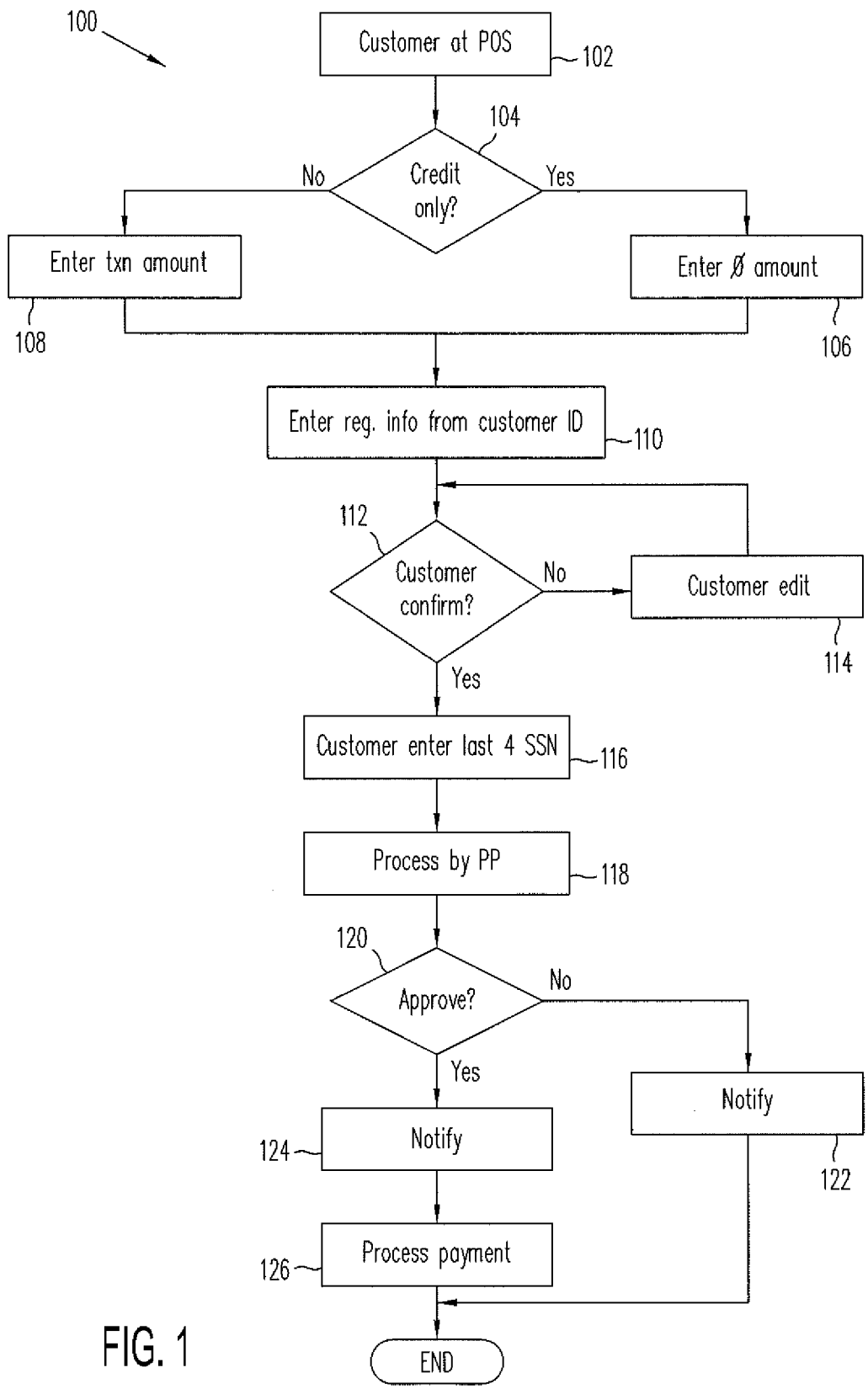
FIG. 1 is a flowchart showing one embodiment of obtaining instant credit at a point of sale (POS) with limited information.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing one embodiment of obtaining instant credit at a point of sale (POS) with limited information. The credit can be provided by a payment provider, such as PayPal, Inc. of San Jose, Calif. or Bill Me Later. At step 102, the consumer is at a physical POS, such as at a register of a merchant.

The consumer may be ready to make a purchase of items from the merchant or to apply for credit at the POS, as determined at step 104. The sales associate at the POS may select an option from a terminal or virtual terminal, where options may include applying for credit without a purchase, applying for and paying with credit, and pay with existing credit or account. The screen may be displayed when the sales clerk initiates a transaction with the consumer or after all items have been scanned or otherwise entered and a total obtained. On instruction from the consumer, the sales associate may select the desired option.

If the consumer wants to apply for a credit only at this time, a zero dollar amount is passed to the payment provider at step 106. In another embodiment, a zero dollar amount may be entered by the sales associate, which is then communicated to the payment provider. The sales associate may also proceed with this process in other ways, such as by selecting an appropriate option on a merchant device or terminal. Other transaction details may also be communicated, such as details of the purchase, information about the items, merchant information, etc.

If the consumer wants to apply for credit and use the credit to pay for the purchase, the payment amount may be passed to the payment provider, at step 108, through the merchant terminal. In another embodiment, the sales associate may enter the payment amount, which is then passed to the payment provider.

Next, at step 110, information about the consumer is communicated to the payment provider. In this embodiment, the sales associate enters requested information obtained from a consumer identification, such as a driver's license, through a merchant terminal in communication with the payment provider. In another embodiment, the consumer may enter the information, such as through a merchant terminal accessible by the consumer. The information, in one embodiment, includes the consumer's name, mailing address, zip code, phone number (e.g., a cell number, a home number, a work number), and date of birth. An email address may be required in one embodiment. The email address and phone number may be requested by the sales associate from the consumer if not available on the identification. If the consumer enters the information, the sales associate may be asked to verify the accuracy of the information entered by inspecting the consumer's identification.

Once the information is entered, it is submitted to another merchant device, such as a PIN pad, that the consumer can see. The information is displayed on the device, and the consumer is asked, at step 112, to confirm the accuracy of the information. If the information is not correct, the consumer may select a button on the PIN pad to edit the information, at step 114. In one embodiment, the sales associate is notified that the information requires editing and changes one or more fields. For example, the sales associate may ask to see the consumer identification again and use that to reenter information. Once entered, the information may again be displayed to the consumer for verification.

Once the consumer verifies the entered information, such as selecting a suitable button on the PIN pad, the consumer will be asked to enter the last four digits of the consumer's social security number (SSN). The consumer may be presented with a screen on the PIN pad, requesting this information. The consumer then enters the last four digits of the SSN via the PIN pad at step 116. Once entered, the consumer selects a button to transmit information to the payment provider, where the information is processed at step 118, to determine whether the payment provider can provide credit to the consumer or otherwise open a credit account for the consumer. Methods of processing may differ between different payment providers. In one example, processing is described in commonly-owned U.S. Pat. No. 7,890,393.

A determination is thus made, at step 120, whether to approve the credit or credit plus purchase request. If the credit is denied, the consumer and the sales associate are notified accordingly, at step 122. For example, the consumer may be notified, on the PIN pad, of a denial and that a letter or other communication will be sent to the consumer providing reasons for the denial. The sales associate may be notified, through the merchant terminal, that the credit has been denied. The sales associate can then take an appropriate action, such as requesting another form of payment from the consumer if the consumer was also requesting payment for the transaction.

If the credit or credit plus purchase request is approved at step 120, the consumer and the sales associated may be notified at step 124. Consumer notification may be through the PIN terminal at the merchant POS or through the consumer's mobile device. For example, the consumer may see a screen on the PIN terminal notifying the consumer that the account was approved, along with a credit line amount and the amount spent on the current transaction (if a purchase request was also included). The merchant may be notified, such as through the merchant terminal, that the purchase is complete, along with a transaction ID and amount.

The payment provider may process the payment at step 126, such as crediting an account of the merchant with the payment amount (minus any fees), and debiting or incurring a charge on the consumer account just created. Note that payment processing may be done prior to the notify step 124, afterwards, or concurrently.

In one embodiment, the consumer may be presented, during various times in the process above, with a screen with terms and conditions for a promotional offer or other offer that the consumer can accept or decline. If declined, the process ends and the processing continues. If accepted, the consumer may be provided the promotional offer during or after the transaction.

Figure 2:
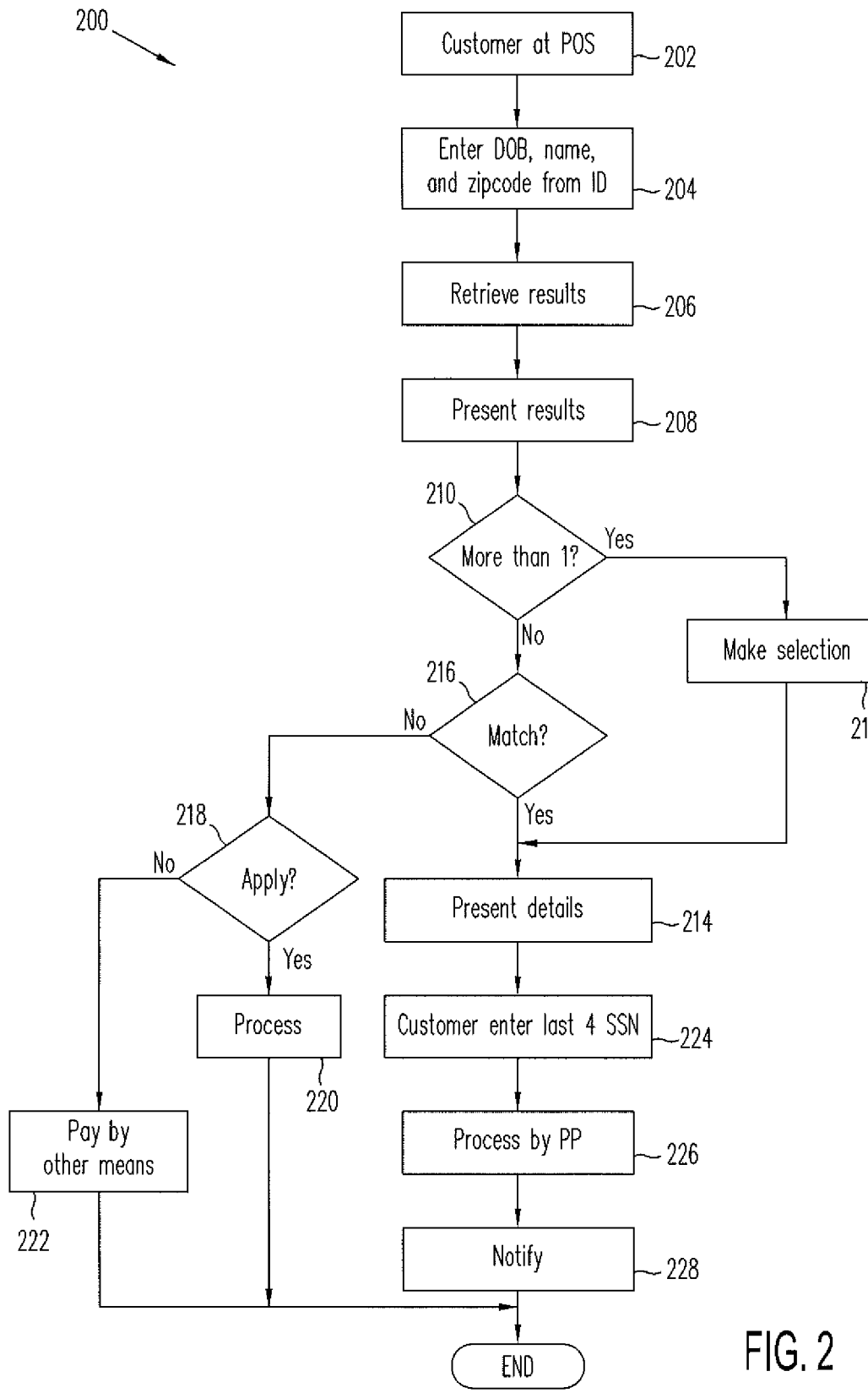
FIG. 2 is a flowchart showing one embodiment of making a purchase at a POS using an account already opened in FIG. 1.

FIG. 2 is a flowchart 200 showing one embodiment of making a purchase at a POS using an account already opened with the payment provider, such as an account described in FIG. 1 above. When the consumer is ready to make a purchase, at step 202, the consumer goes to the POS of a merchant, which can be a checkout register or terminal at a physical store. In one embodiment, the sales associate may ask the consumer for a type of payment. In another embodiment, the consumer may select a type of payment from a merchant device, such as a PIN pad. Here, the payment type would be payment with an existing account with a payment provider.

Next, specific information is entered and communicated to the payment provider, at step 204. The sales associate may ask to see a driver's license or other identification from the consumer, which shows the requested information. In one embodiment, the information is the date of birth, last name, and zip code of the consumer's address. The information may be entered by the sales associated at the beginning of the transaction (when the sales associates is has not yet scanned a first item), during the transaction, or after all items have been scanned and totaled, the consumer may enter specific information requested on a device. The device, in one embodiment, is a virtual terminal for the merchant at the POS.

Once entered and communicated, the payment provider retrieves results based on the information, at step 206. The payment provider may search a database to determine which account(s) are associated with the information. If more than one account is found, at step 210, the sales associate and/or the consumer may be presented with a list of the results. In one embodiment, only the sales associate is shown the list for privacy concerns. The list may include the name associated with the account and an address. Because the earlier requested information did not include a full address, but only a zip code, multiple accounts may be possible with the same last name, date of birth, and zip code.

The sales associate may compare the results with the identification of the consumer and make a selection, at step 212, of the correct consumer. Selection may be by tapping or otherwise choosing the name or checking a box next to the correct name. Once the selected account is communicated to the payment provider, the payment provider may present details of the account, at step 214, to the sales associate, such as through the virtual terminal. For example, the sales associate may see, on screen, store details, such as a transaction ID, store name, store address, and transaction amount, and consumer account details, such as the consumer first name, last name, address, phone number, date of birth, and possibly email address.

Returning back to step 210, if the payment provider does not find more than one match (i.e., finds zero or one match), a determination is made, at step 216, whether there was a match. If there was no match, the consumer may be asked, such as through the sales associate, whether the consumer wishes to apply for an account or credit with the payment provider. If the consumer wishes to apply for credit (either credit only or credit plus payment for the current purchase), the credit application is processed, at step 220, such as using steps of the process in FIG. 1 above. The sales associate may select a link to start the credit application process. If the consumer does not wish to apply for credit, the consumer may pay for the transaction by other means, at step 222, such as cash, check, debit card, credit card, gift card, or the like.

If, at step 216, there is a match (indicating a single matched account), the account details may be presented at step 214, as discussed above. The consumer may, at the same time or afterwards, be presented with a screen requesting entry of the last four digits of the consumer's SSN. This can be shown on the merchant PIN pad. The consumer enters the last four digits of the consumer's SSN, at step 224, and selects a button or link to communicate the information to the payment provider.

Once received, the payment provider processes the transaction request at step 226. The processing is the same or similar to what is described above in FIG. 1. During the processing, the user may be shown one or more promotional offers, which the user can accept or decline. If the offer is accepted, the terms of the offer may be applied to the transaction or account.

After processing, the payment provider may notify the consumer and the sales associate accordingly, depending on whether the transaction was approved or denied, as discussed above. As a result, a returning consumer can quickly and easily use a payment provider account to make a purchase without having a payment provider card. All that is needed is the user's last name, zip code, and date of birth to retrieve the account information.

Note that the above embodiment primary describes a sales associate entering information into a terminal and the consumer entering information into a PIN pad. In various embodiments, information can be entered by the same party, different parties, and/or on different devices. For example, the consumer, instead of the sales associate, may enter identifying information into a user device, such as a smart phone, instead of through a merchant device.

Figure 3:
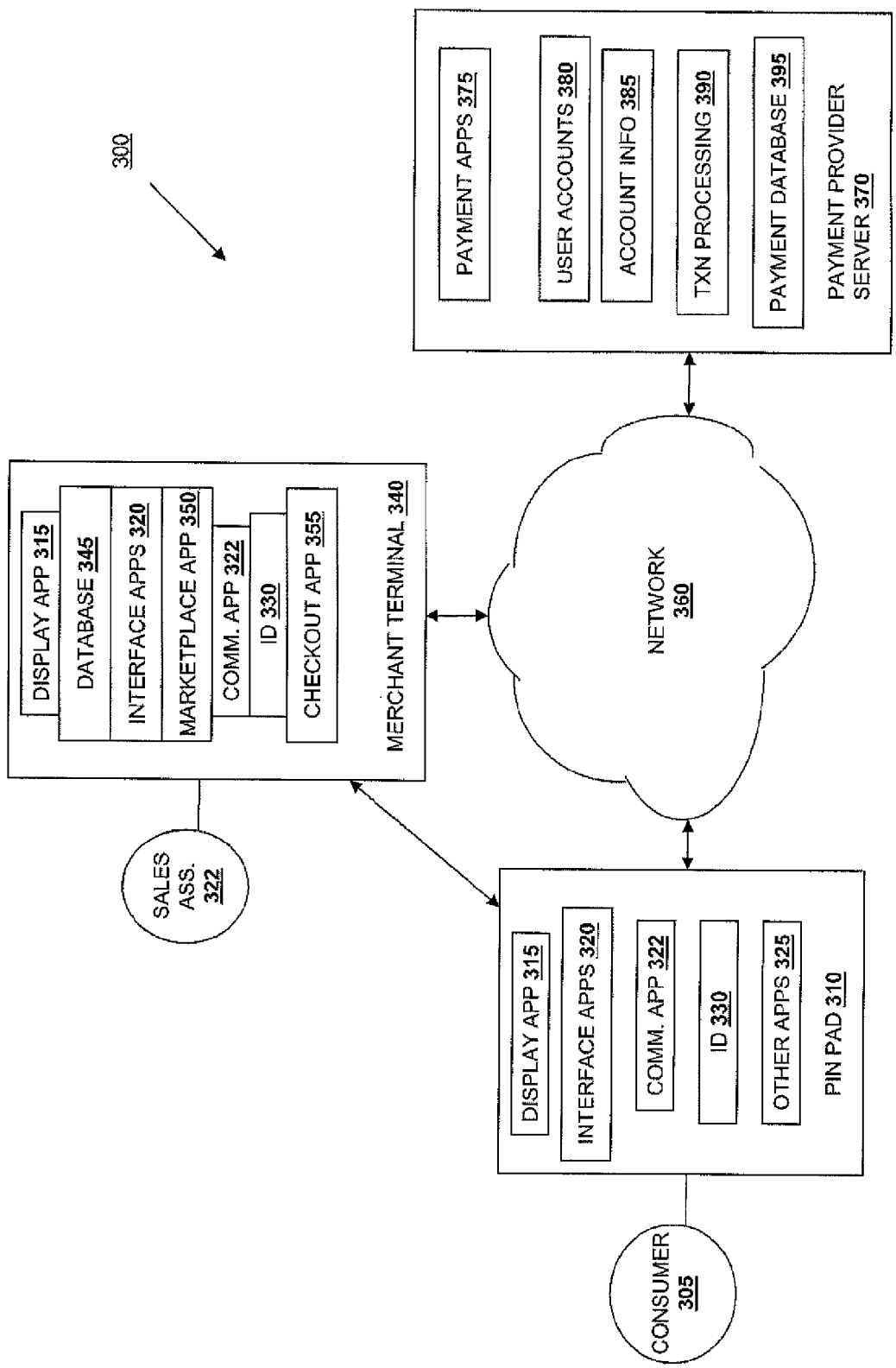
FIG. 3 is a block diagram of a networked system suitable for implementing the processes described herein according to an embodiment.

FIG. 3 is a block diagram of a networked system 300 configured to process a financial transaction between a payment recipient (e.g., merchant) and a payment sender (e.g., user or consumer) at a POS, such as described above, in accordance with an embodiment of the invention. System 300 includes a PIN pad 310, a merchant terminal 340, and a payment provider server 370 in communication over a network 360. Payment provider server 370 may be maintained by a payment provider, such as Bill Me Later. A consumer or user 305 utilizes PIN pad 310 to view, enter, and communicate information for conducting a payment transaction with the merchant using payment provider server 370.

PIN pad 310, merchant terminal 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

PIN pad 310 may be implemented using any appropriate hardware and software configured for wired and/or wireless communication over network 360. For example, in one embodiment, the PIN pad may be a computing device having a display and input/output means to receive and transmit information between merchant terminal 340 and payment provider server 370.

PIN pad 310 may include one or more display applications 315 which may be used, for example, to provide a convenient interface to permit consumer 305 to view information available over network 360. For example, in one embodiment, display application 315 may be implemented to view information or data from merchant terminal 340 and/or payment provider server 370, such as a PIN entry screen. PIN pad 310 may also include one or more interface applications 320 which may be used, for example, to translate user input on PIN pad 310 to appropriate signals for processing and communicating. For example, interface application may be used to translate a user entering digits from a physical or virtual PIN pad for communication to payment provider server 370.

PIN pad 310 may further include other applications 325 as may be desired in particular embodiments to provide desired features to PIN pad 310. For example, other applications 325 may include security applications for implementing client-side security features, programmatic client applications for interfacing with appropriate application programming interfaces (APIs) over network 360, such as encoding information between the PIN pad key entry and transmission through network 360. PIN pad 310 includes one or more identifiers 330 which may be implemented, for example, as operating system registry entries, identifiers associated with hardware of PIN pad 310 or the merchant, or other appropriate identifiers, such as used for payment/user/device authentication. In one embodiment, identifier 330 may be used by a payment service provider to associate a merchant with a particular account maintained by the payment provider as further described herein. A communications application 322, with associated interfaces, enables PIN pad 310 to communicate within system 300.

Merchant terminal 340 may be maintained, for example, by a merchant or seller offering various products and/or services in exchange for payment to be received over network 360 or at the POS. Generally, merchant server 340 may be maintained by anyone or any entity that receives money, which includes charities as well as retailers and restaurants. A sales associate 342 may operate merchant terminal 340 to process a payment for items to be purchased by consumer 305. Merchant server 340 includes a database 345 identifying available products and/or services (e.g., collectively referred to as items) which may be made available for purchase by consumer 305. Accordingly, merchant server 340 also includes a marketplace application 350 which may be configured to serve information over network 360, such as to view and obtain information about available items, including price, quantities, etc.

Merchant server 340 also includes a checkout application 355 which may be configured to facilitate the purchase by consumer 305 of goods or services offered by the merchant. Checkout application 355 may be configured to accept payment information from or on behalf of consumer 305 through payment service provider server 370 over network 360. For example, checkout application 355 may receive and process a payment confirmation or payment options from payment service provider server 370, as well as transmit transaction information to the payment provider and receive information from the payment provider. Checkout application 355 may also be configured to accept one or more different funding sources and/or other payment options for payment, as well as create an invoice or receipt of the transaction.

Merchant terminal 340 may also include display applications 315, interface applications 320, communication applications 322, and identification applications 330, which may be the same or similar as the ones in PIN pad 310. For example, display applications 315 may allow sales associate 342 to view payment options and request screens from payment provider server 370, interface applications 320 may allow sales associate 322 to enter and transmit consumer ID information to payment provider server 370, communication applications 322 may allow merchant terminal 340 to communicate with PIN pad 310 and payment provider server 370, and identification applications 330 may allow payment provider server 370 to identify the merchant associated with the payment transaction.

Payment provider server 370 may be maintained, for example, by an online payment service provider which may provide payment between consumer 305 and the operator of merchant terminal 340 (e.g., the merchant). In this regard, payment provider server 370 includes one or more payment applications 375 which may be configured to interact with PIN pad 310 and/or merchant terminal 340 over network 360 to facilitate the purchase of goods or services by consumer 305 at a merchant POS as discussed above.

Payment provider server 370 also maintains a plurality of user accounts 380, each of which may include account information 385 associated with individual users or consumers. For example, account information 385 may include private financial information of users of devices such as account numbers, passwords, device identifiers, user names, phone numbers, credit card information, bank information, or other financial information which may be used to facilitate online transactions by consumer 305. Other information may include user addresses, including zip code, date of birth, and at least the last four digits of the user's social security number. Advantageously, payment application 375 may be configured to interact with merchant device 340 and/or PIN pad 310 on behalf of consumer 305 during a transaction with checkout application 355 to track and manage purchases made by users and which funding sources are used.

A transaction processing application 390, which may be part of payment application 375 or separate, may be configured to receive information from a user device, PIN pad 310, and/or merchant terminal 340 for processing and storage in a payment database 395. Transaction processing application 390 may include one or more applications to process information from consumer 305 and/or sales associate 322 for processing a request for credit and/or payment at a merchant POS as described herein. As such, transaction processing application 390 may store details of an order associated with an account for individual users as well as track pending payment transactions. Payment application 375 may be further configured to determine the existence of and to manage accounts for consumer 305, as well as create new accounts if necessary.

Payment database 395 may store transaction details from completed transactions, including transaction identifiers. Such information may also be stored in a third party database accessible by the payment provider and/or the merchant.

Figure 4:
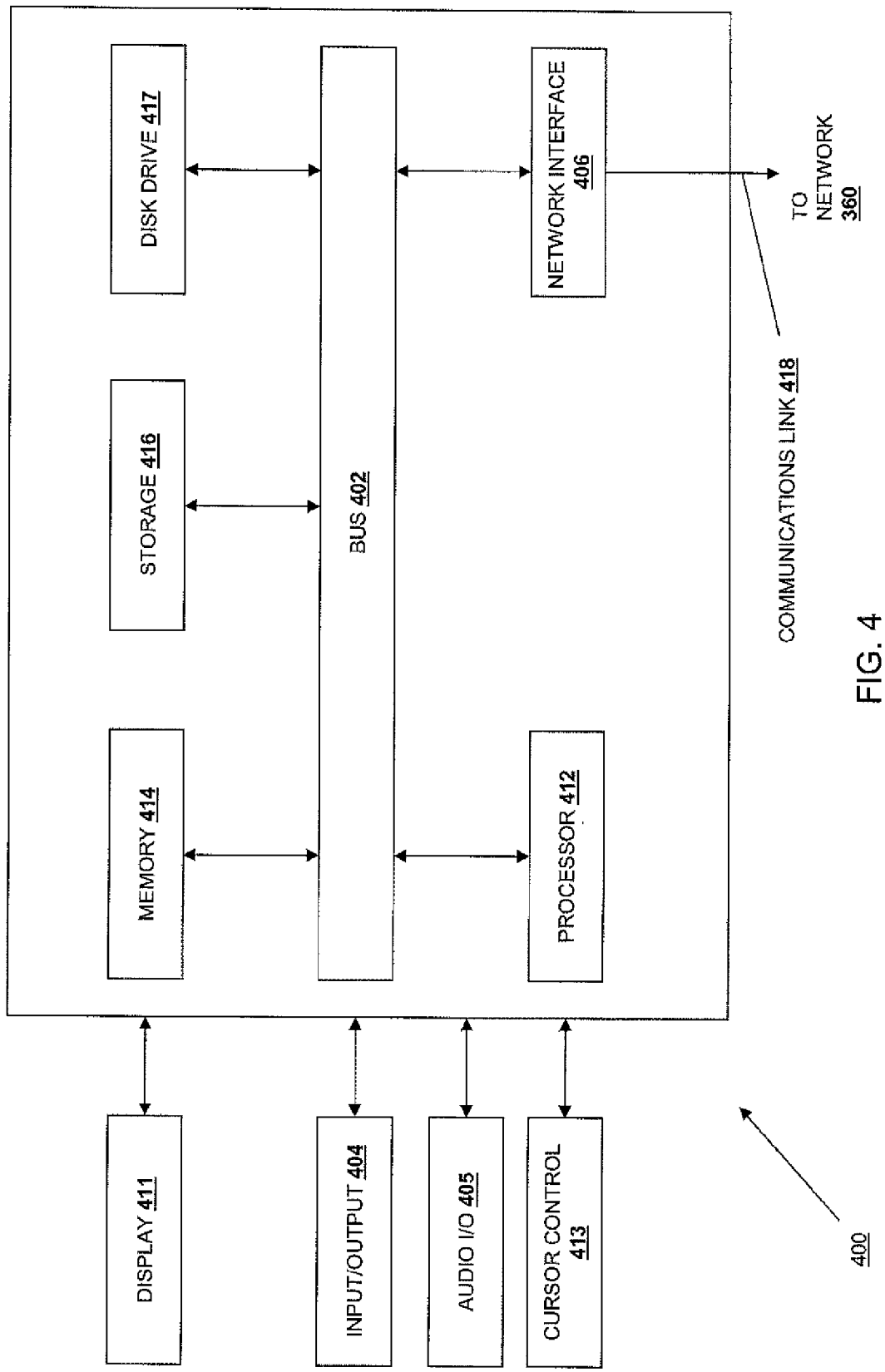
FIG. 4 is a block diagram of a computer system suitable for implementing one or more components in FIG. 3 according to one embodiment of the present disclosure.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for electronically processing a payment at a point of sale, the method comprising:
    receiving, electronically by a hardware processor of a payment provider, a payment request from a transaction device at a merchant point of sale (POS);
    receiving, electronically by the hardware processor, identification information for a user provided via the merchant POS, wherein the identification information comprises a last name, a zip code, and a date of birth of the user;
    accessing, electronically by the hardware processor, a preexisting account of the user stored in a database associated with the payment provider based on the received identification information without requiring the hardware processor to receive, from the merchant POS, financial information associated with the preexisting account;
    receiving, electronically by the hardware processor, verification information of the user entered by the user at the merchant POS, the verification information being entered after the identification information is received and after the preexisting account of the user is accessed;
    in response to determining that the verification information corresponds to last four digits of a social security number (SSN) of the user stored in the database, approving the payment request using the preexisting account of the user based on the last four digits of the SSN without requiring the user to provide a payment provider card; and
    processing, electronically by the hardware processor, the payment request in response to the approving.

2. The method of claim 1, wherein the identification information is received from the transaction device.

3. The method of claim 2, wherein the identification information is entered into the transaction device by a sales associate from a user ID.

4. The method of claim 1, wherein the wherein the verification information comprises a last four digits of a SSN received from a merchant personal identification number (PIN) device.

5. The method of claim 4, wherein the last four digits of the SSN are entered into the PIN device by the user.

6. The method of claim 1, further comprising presenting a plurality of matching results to a sales associate if the received identification information returns more than one preexisting account.

7. The method of claim 6, further comprising receiving a selected user from the matching results.

8. The method of claim 7, wherein the selected user is selected by the sales associate.

9. The method of claim 1, further comprising notifying a sales associate and the user when the payment request is approved or denied.

10. The method of claim 1, wherein the preexisting account of the user is used to fund the payment request.

11. The method of claim 1, wherein user information is entered by a sales associate.

12. The method of claim 4, wherein the last four digits of the user SSN is entered by the user.

13. The method of claim 11, wherein the user is requested to confirm user information entered by the sales associate.

14. The method of claim 9, wherein the sales associate is notified through a merchant personal identification number (PIN) device.

15. The method of claim 9, wherein the user is notified through a user mobile device.

16. The method of claim 1, wherein the payment request is funded by cash, check, debit card, credit card, or gift card.

\* \* \* \* \*